United States Patent [19]
Dillon, III

[11] Patent Number: 5,515,069
[45] Date of Patent: May 7, 1996

[54] APPARATUS FOR RELIEVING EYESTRAIN AND FATIGUE

[76] Inventor: John A. Dillon, III, 1020 Canyon Rd., #D, Santa Fe, N.M. 87501

[21] Appl. No.: 146,524
[22] Filed: Nov. 1, 1993
[51] Int. Cl.⁶ ..................................................... G09G 5/00
[52] U.S. Cl. ............................................... 345/6; 362/253
[58] Field of Search ................................... 128/24.1, 745; 362/86, 249, 234, 243, 253; 348/578; 345/4, 5, 6, 139; 340/815.4

[56] References Cited

U.S. PATENT DOCUMENTS

| | | | |
|---|---|---|---|
| 2,805,324 | 11/1953 | Zedric, Jr. | 362/86 |
| 4,527,186 | 7/1985 | Acker | 348/578 |
| 4,553,534 | 11/1985 | Stiegler | 128/24.1 |
| 4,955,388 | 9/1990 | Silberstein | 128/745 |
| 5,325,133 | 6/1994 | Adachi | 345/157 |

OTHER PUBLICATIONS

Godning, Edward G. and Hacunda, John S. "Computers and Visual Stress: How to enhance Visual Comfort While Using Computers", Seacoast Information Services, Charlestown, Rhode Island, Jan. 1990, chapter 4—The VDT Working Enviroment and Visual Stress.

Primary Examiner—Curtis Kuntz
Assistant Examiner—Vivian W. Chang
Attorney, Agent, or Firm—Samuel M. Freund

[57] ABSTRACT

Apparatus for relieving eyestrain and fatigue. A plurality of light sources, arranged in a selected three-dimensional pattern around a video display terminal, automatically cycling through a selected sequenced pattern at chosen time intervals for specific time periods, provides stimulation for the eyes away from the two-dimensional surface of the terminal screen. Colors and shapes of the light sources may be varied in order to maintain user interest.

21 Claims, 5 Drawing Sheets

APPARATUS FOR RELIEVING EYESTRAIN AND FATIGUE

BACKGROUND OF THE INVENTION

The present invention relates generally to relief of eyestrain and fatigue and, more particularly, to an apparatus for generating sequenced light patterns in three-dimensions which when followed by the eyes of a user thereof provide eye exercise resulting in relief of eye strain and fatigue.

It is well known that extended use of video display terminals (VDTs) is a cause of eye fatigue and strain for the user. See, for example, "Video Display Terminal Health Hazards #1," Fact Sheet, from the Occupational Health and Safety Bureau of the New Mexico Environment Department, Santa Fe, N. Mex. 87502. It is also well known that performing eye exercises relieves some of the symptoms of eye strain and fatigue. See, for example, "Video Display Terminal Health Hazards #1," supra, where it is suggested that in addition to rest breaks, eyes may be rested by looking up or at long distances. Moreover, *Computers and Visual Stress: How to Enhance Visual Comfort While Using Computers*, by E. G. Godnig and J. S. Hacunda, Seacoast Information Services, Charlestown, R.I. (1990), states that staring for extended periods at a flat, two dimensional display, provides little visual relief and may not provide enough eye stimulation to maintain proper focus.

Although there are several products presently commercially available which provide moving light displays for stimulating eye movement, some in color, for claimed relief of stress as well, they are all substantially planar. Causing the eyes to follow three-dimensional patterns, however, exercises and thereby strengthens many of the eye muscles involved in the vision process.

Accordingly, it is an object of the present invention to provide an apparatus for generating sequenced, three-dimensional light patterns for eye exercises.

Another object of the present invention is to provide an apparatus for generating sequenced, three-dimensional light patterns for eye exercises having a multiplicity of colors and patterns in order to maintain interest in the user thereof.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the apparatus for relieving eyestrain and fatigue resulting from extended use of video display terminals hereof may include a plurality of light sources removably attached to the video display terminal and forming a three-dimensional array having a chosen configuration, and means for establishing a chosen sequenced light pattern in the plurality of light sources; whereby a user's eyes are distracted from the video display terminal at chosen intervals, and may follow the light pattern established in the light sources, thereby receiving beneficial exercise.

Preferably, the light sources have chosen colors and shapes which may be changed to maintain user interest.

It is also preferred that the light sources are caused to automatically cycle through their chosen flashing pattern at the chosen intervals.

Benefits and advantages of the present invention include automatic distraction of a user at selected intervals from the substantially two-dimensional surface of the video display terminal for chosen time periods in order to permit the eyes to recover from the strain of focusing thereon using apparatus which is readily adaptable to all video display terminals.

BRIEF DESCRIPTION OF THE DRAWINGS

The accompanying drawings, which are incorporated in and form a part of the specification, illustrate four general embodiments of the present invention and, together with the description, serve to explain the principles of the invention.

DETAILED DESCRIPTION OF THE PREFERRED EMBODIMENTS OF THE INVENTION

Briefly, the present invention in its broadest form includes a plurality of light sources arranged in a chosen pattern around a video display terminal and adapted to automatically provide a sequenced pattern at selected intervals.

Figure 1:
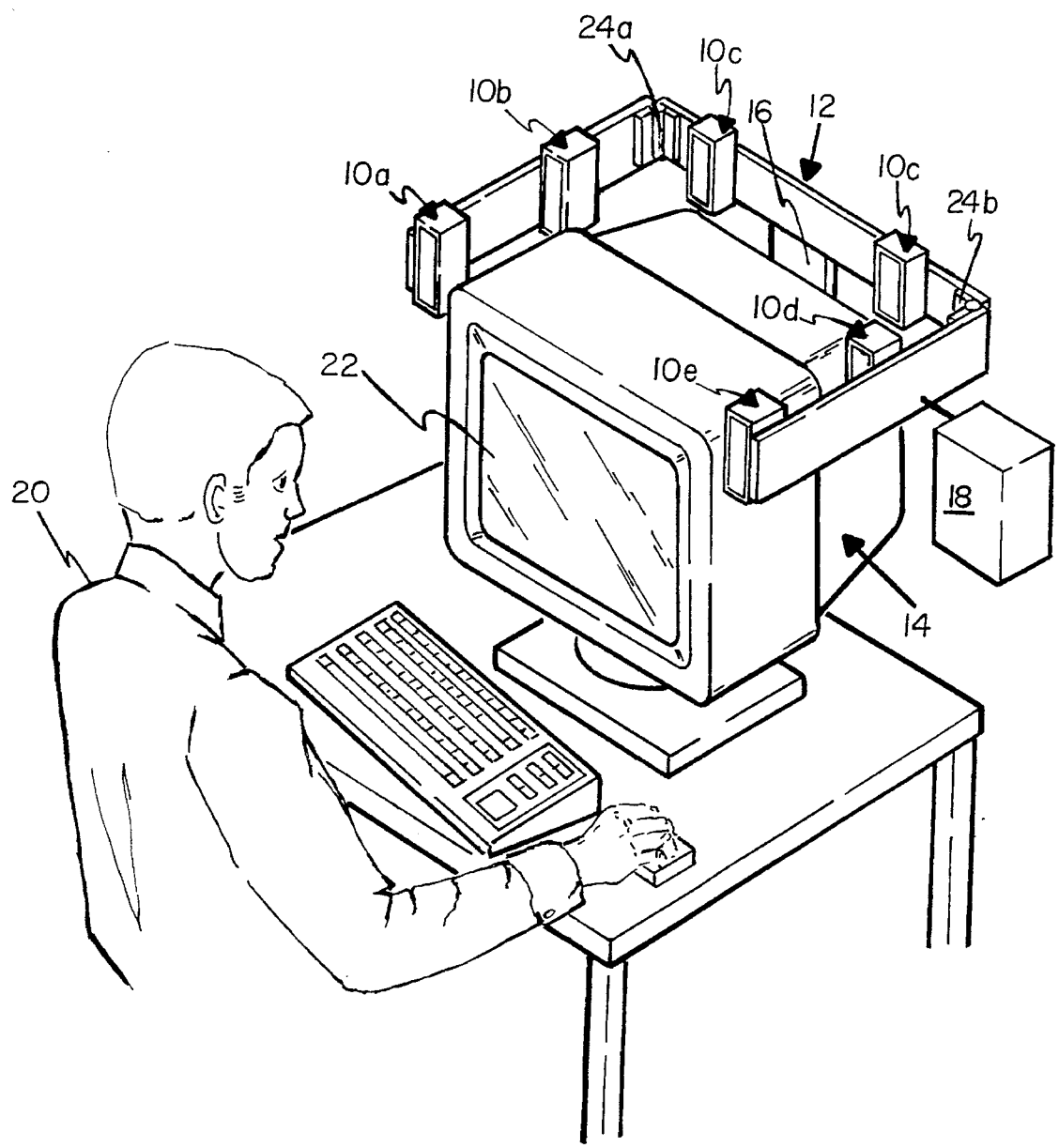
FIG. 1 is a schematic representation of perspective view of an embodiment of the eyestrain and fatigue relief apparatus of the present invention adapted to be mounted on a video display terminal as a unit.

Reference will now be made in detail to the present preferred embodiments of the invention, an example of which is illustrated in the accompanying drawings. Identical or similar structure will be identified with identical callouts. FIG. 1 is a schematic representation of a perspective view of an embodiment of the eyestrain and fatigue relief apparatus of the present invention adapted to be mounted on a video display terminal as a unit. Light sources 10*a–e* are moveably mounted on frame 12 which is mounted by support 16 to video display terminal 14. Power source 18 provides energy to the light sources at chosen intervals in selected sequenced patterns. It should be mentioned that any number of light sources in various configurations on the frame may be utilized for a given application. Moreover, power source 18 may be operated from an ac source or from battery power, dependent upon the power usage of the lamps employed. User 20 is distracted from the substantially planar, two-dimensional surface 22 of video display terminal 14 automatically, at preselected intervals for chosen time periods. It is anticipated that, generally, 2–5 minute time periods of stimulation occurring approximately every hour will provide the desired relief from eyestrain and fatigue for the user. However, different individuals, different working environments, and different times of the workday may dictate refinements of this regimen. The colors and shapes of the light emitters within light sources 10 may be changed from time to time in order to maintain user interest. Hinges 24a,b in frame 12 permit the dimensions of the array to be changed in order to alter the depth and peripheral focus for the eyes.

Figure 2:
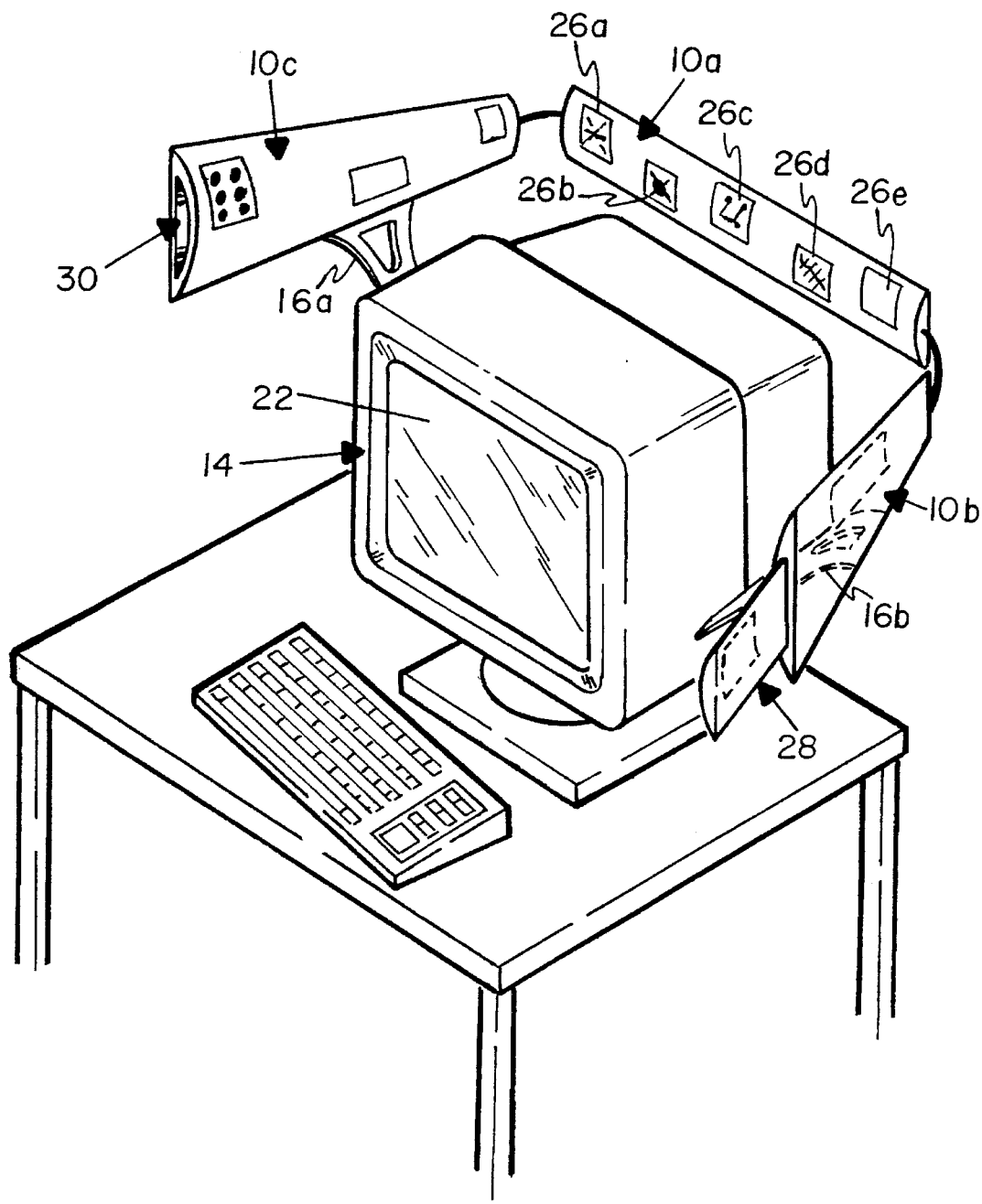
FIG. 2 is a schematic representation of a second embodiment of the pre sent apparatus adapted to be mounted on a video display terminal as a unit, showing an alternate mounting arrangement.

FIG. 2 is a schematic representation of a second embodiment of the present apparatus adapted to be mounted on a video display terminal as a unit, showing an alternate mounting arrangement. Light source 10a is shown to have several individual light generators 26a–e, each having a different pattern. Similarly, for light sources 10b and 10c. Supports 16a and 16b are reversibly and adjustably attached to video display terminal 14. One convenient manner in which to accomplish this task would be to employ fastening tape consisting of opposing pieces of fabric, one with a dense arrangement of tiny nylon hooks, and the other with a dense nylon pile, that interlock when pressed together, and commonly available under the Tradename Velcro. Power source 18, shown in FIG. 1 hereof, might be located within one of the light source modules and provide the power and timing for all of the light sources employed. Light source 28 is shown extending from light source 10b in the event that it is desirable to extend the dimensions of the overall array. A slot 30 for a second such a light source is shown in light source 10c.

Figure 3:
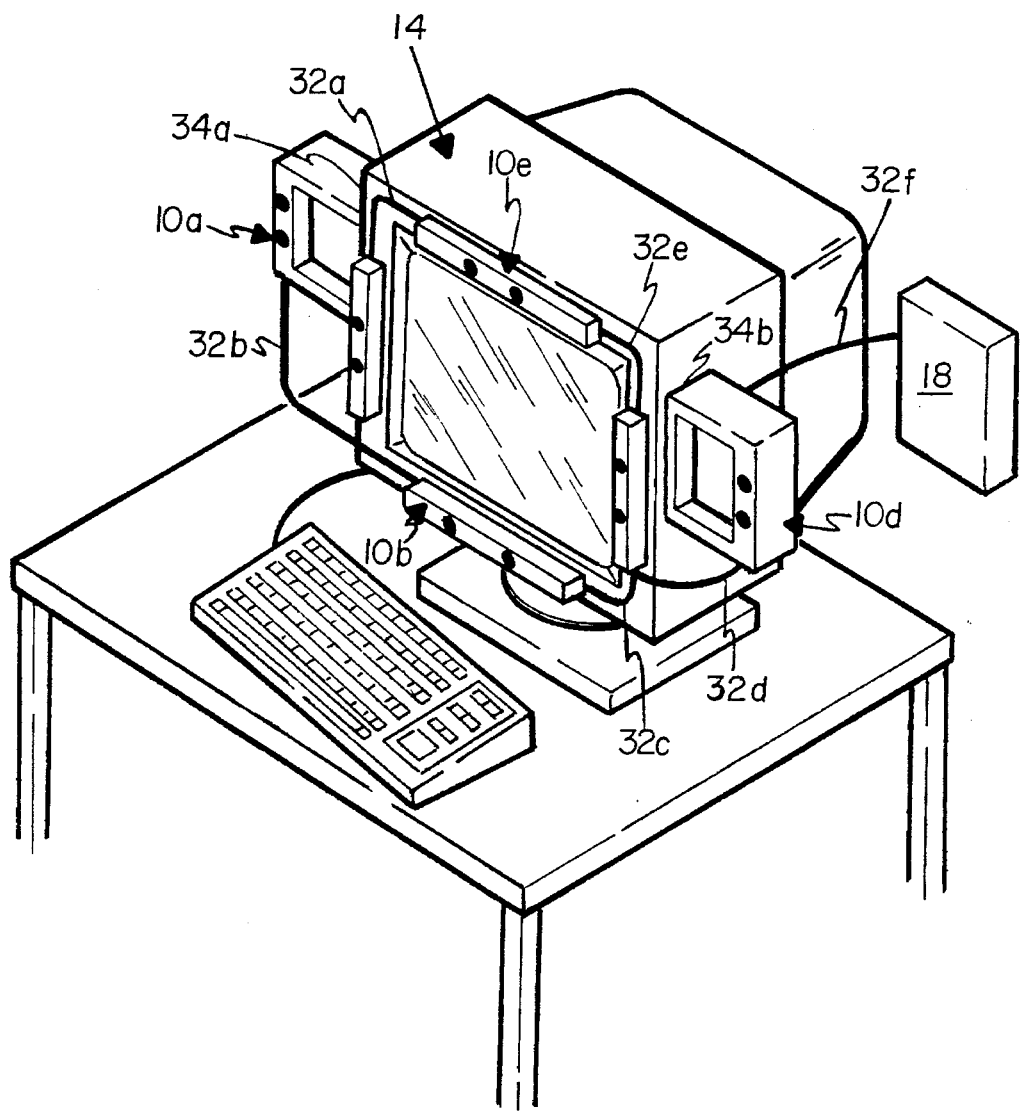
FIG. 3 is a schematic representation of a system embodiment of the apparatus of the present invention illustrating a plurality of cooperating light sources adapted to be removably attached to a video display terminal as separate units, forming selected patterns.

FIG. 3 is a schematic representation of a system embodiment of the apparatus of the present invention illustrating a plurality of cooperating light sources adapted to be removably attached to a video display terminal as separate units, forming selected patterns. Power source 18 supplies energy and timing sequence information through electrical connections 32a–f to light sources 10a–e located around the periphery of the front of video display terminal 14. Again, the light sources may have various colors and shapes which may be changed from time-to-time in order to maintain user interest. Hinges 34a,b permit light sources 10a and 10d to be moved forward and backward in order to provide a three-dimensional aspect to the system.

Figure 4:
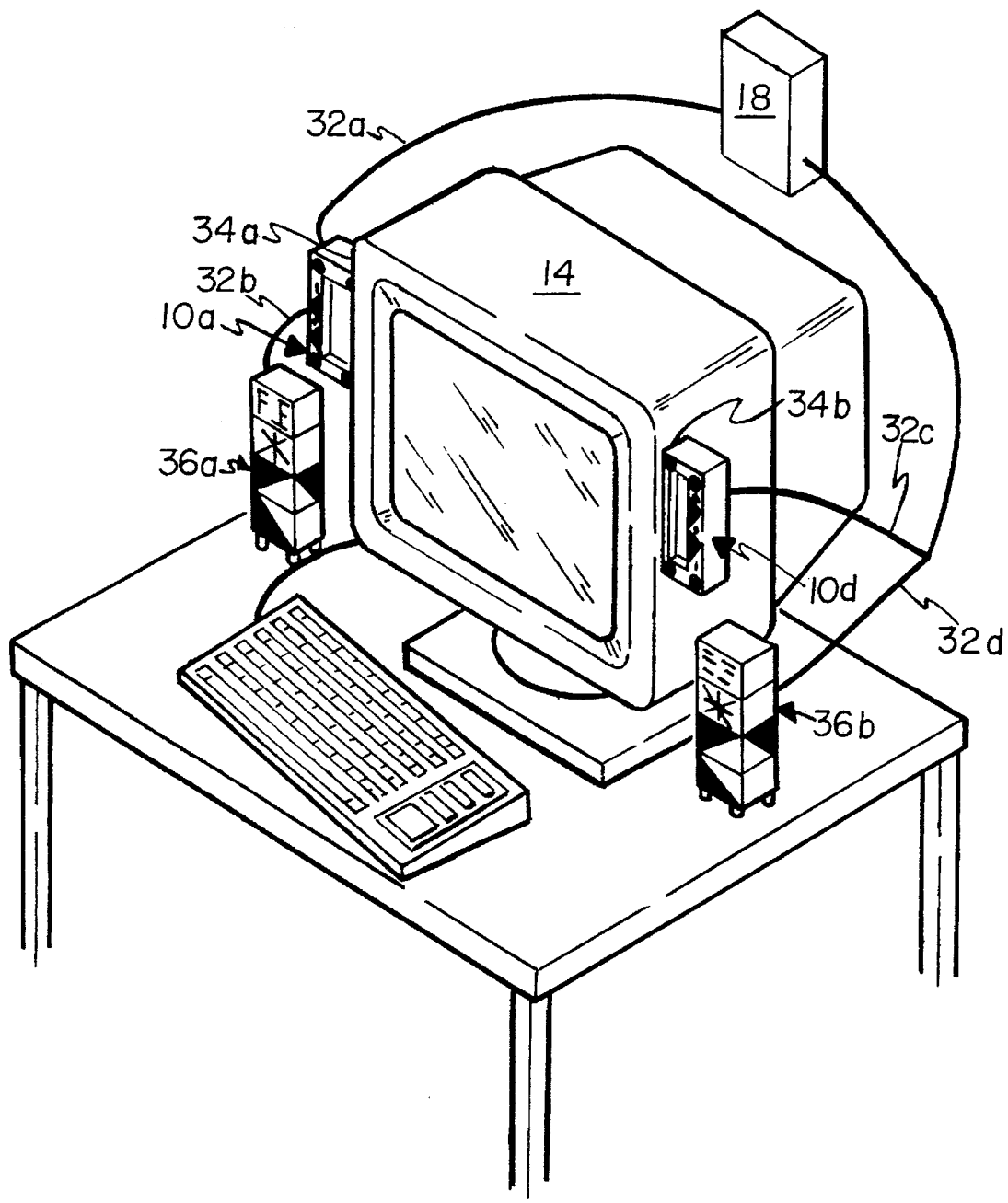
FIG. 4 is a schematic representation of a perspective view the system embodiment of cooperating light sources shown in FIG. 3 hereof, illustrating light sources located independently of the video display terminal in order to increase the peripheral and depth dimensions of the system, and suitable for achieving numerous three-dimensional patterns.

FIG. 4 is a schematic representation of a perspective view the system embodiment of cooperating light sources shown in FIG. 3 hereof, illustrating light sources located independently of the video display terminal in order to increase the peripheral and depth dimensions of the system, and suitable for achieving numerous three-dimensional patterns. Power source 18 supplies energy and timing sequence information to light sources 10a and 10b which are mounted on video display terminal 14 and to external light sources 36a,b which may be moved around to provide variations in the three-dimensional configuration. It should be mentioned that the light sources should be placed well within the maximum vertical and horizontal viewing angles of the eyes of the user in order to provide a continuous directing influence thereon.

Figure 5:
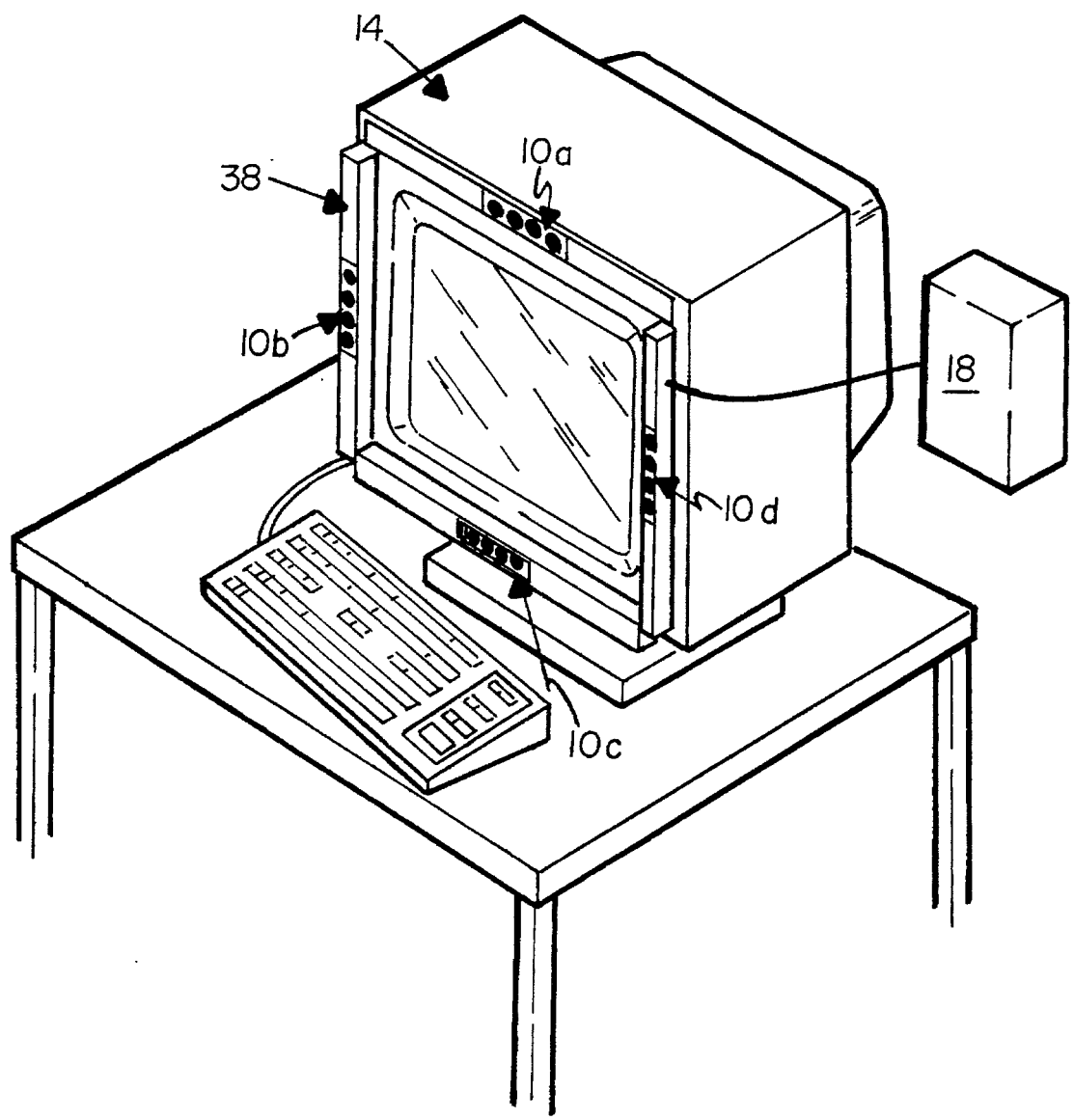
FIG. 5 is a schematic representation of the front view of a flat frame embodiment of the apparatus of the present invention adapted to be mounted on a video display terminal, the flat frame being suitable for use with the external components shown in FIG. 4 hereof in order to achieve a third dimension.

FIG. 5 is a schematic representation of the front view of a flat frame embodiment of the apparatus of the present invention adapted to be mounted on a video display terminal, the flat frame being suitable for use with the external components shown in FIG. 4 hereof in order to achieve a third dimension. Frame 38 supports light sources 10a–d, and external components 36 illustrated in FIG. 4 hereof may be electrically connected thereto in order to provide three-dimensional configurations.

The foregoing description of several preferred embodiments of the invention has been presented for purposes of illustration and description. It is not intended to be exhaustive or to limit the invention to the precise form disclosed, and obviously many modifications and variations are possible in light of the above teaching. For example optical fibers and light emitting diodes may be used in place of incandescent light sources in order to permit batteries to be utilized instead of conventional ac electric power sources. Additionally, the present invention may be used to relieve eyestrain and fatigue due to other causes, such as reading. In this situation, the light sources might be deployed in a three-dimensional array which would include the use of a table and a wall, in one embodiment. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for relieving eyestrain and fatigue resulting from extended use of video display terminals, said apparatus comprising in combination:
   a. a plurality of light sources removably attached to the video display terminal forming a three-dimensional array having a selected configuration; and
   b. means for establishing a chosen sequenced light pattern in said plurality of light sources; whereby the user's eyes are distracted from the video display terminal at chosen intervals for specific time periods, and may follow the light pattern established in said light sources, thereby providing exercise therefor.

2. The apparatus as described in claim 1, wherein each light source in said plurality of light sources is selected to have a particular color.

3. The apparatus as described in claim 1, wherein each comprising means for automatically activating said plurality of light sources at chosen time intervals during the operation of the video display terminal.

4. The apparatus as described in claim 1, wherein at least one light source in said plurality of light sources is covered by at least one removable light-transmitting mask, thereby permitting said at least one light source to have different shapes.

5. The apparatus as described in claim 4, wherein said at least one light transmitting mask has a multiplicity of shapes and colors, one shape and color being selectable at a time.

6. The apparatus as described in claim 1, wherein said plurality of light sources is supported by a generally U-shaped frame adapted to be fit around the video display terminal.

7. A system for relieving eyestrain and fatigue resulting from extended use of video display terminals, said system comprising in combination:
   a. a plurality of light sources disposed in the vicinity of the video display terminal forming a selected three-dimensional array; and
   b. means for establishing a chosen sequenced light pattern in said plurality of light sources; whereby the user's eyes are distracted from the video display terminal at chosen intervals for specific time periods, and may follow the light pattern established in said light sources, thereby providing exercise therefor.

8. The system as described in claim 7, wherein said plurality of light supported is supported by a freestanding, generally U-shaped frame adapted to be fit around the video display terminal.

9. The system as described in claim 7, wherein each light source in said plurality of light sources is selected to have a particular color.

10. The system as described in claim 7, further comprising means for automatically activating said plurality of light sources at chosen time intervals during the operation of the video display terminal.

11. The system as described in claim 7, wherein at least one light source in said plurality of light sources is covered by at least one removable light-transmitting mask, thereby permitting said at least one light source to have different shapes.

12. The system as described in claim 11, wherein said at least one light transmitting mask has a multiplicity of shapes and colors, one of which shapes and colors may be selected at a time.

13. The system as described in claim 7, wherein said plurality of light sources is supported by a substantially flat, generally rectangularly-shaped frame adapted to be fit on the screen of the video display terminal.

14. A system for relieving eyestrain and fatigue resulting from extend ed focusing in two-dimensions, said system comprising in combination:
   a. a plurality of light sources disposed in a selected three-dimensional array; and
   b. means for establishing a chosen sequenced light pattern in said plurality of light sources; whereby the user's eyes are distracted at chosen intervals for specific time periods, and may follow the light pattern established in said light sources, thereby providing exercise therefor.

15. The system as described in claim 14, further comprising means for automatically activating said plurality of light sources at chosen time intervals.

16. An apparatus for relieving eyestrain and fatigue resulting from extended use of video display terminals, said apparatus comprising in combination:
   a. a plurality of light sources, wherein at least one light source in said plurality of light sources is removably attached to the video display terminal, and at least one light source in said plurality of light sources is disposed in the vicinity of the video display terminal, forming thereby a three-dimensional array having a selected configuration; and
   b. means for establishing a chosen sequenced light pattern in said plurality of light sources; whereby the user's eyes are distracted from the video display terminal at chosen intervals for specific time periods, and may follow the light pattern established in said light sources, thereby providing exercise therefor.

17. The apparatus as described in claim 16, wherein each light source in said plurality of light sources is selected to have a particular color.

18. The apparatus as described in claim 16, further comprising means for automatically activating said plurality of light sources at chosen time intervals during the operation of the video display terminal.

19. The apparatus as described in claim 16, wherein at least one light source in said plurality of light sources is covered by at least one removable light-transmitting mask, thereby permitting said at least one light source to have different shapes.

20. The apparatus as described in claim 19, wherein said at least one light transmitting mask has a multiplicity of shapes and colors, one shape and color being selectable at a time.

21. The apparatus as described in claim 16, wherein said plurality of light sources is supported by a generally U-shaped frame adapted to be fit around the video display terminal.

* * * * *